United States Patent
Guo et al.

(10) Patent No.: US 11,252,051 B2
(45) Date of Patent: Feb. 15, 2022

(54) METHOD, DEVICE AND COMPUTER PROGRAM PRODUCT FOR CONFIGURING SERVICE INSTANCE

(71) Applicant: EMC IP Holding Company LLC, Hopkinton, MA (US)

(72) Inventors: Yongsheng Guo, Shanghai (CN); Ming Zhang, Shanghai (CN); Mengze Liao, Shanghai (CN); Raynor Zhang, Shanghai (CN); Mike Zhu, Shanghai (CN); Jing Yu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/232,747

(22) Filed: Apr. 16, 2021

(65) Prior Publication Data

US 2021/0234772 A1    Jul. 29, 2021

Related U.S. Application Data

(62) Division of application No. 16/588,951, filed on Sep. 30, 2019, now Pat. No. 11,012,325.

(30) Foreign Application Priority Data

Apr. 26, 2019  (CN) .......................... 201910345808.6

(51) Int. Cl.
*G06F 15/177* (2006.01)
*H04L 12/24* (2006.01)
*G06F 9/455* (2018.01)

(52) U.S. Cl.
CPC ...... *H04L 41/5054* (2013.01); *G06F 9/45558* (2013.01); *H04L 41/5048* (2013.01); *H04L 41/5051* (2013.01)

(58) Field of Classification Search
CPC ............. H04L 41/5054; H04L 41/5048; H04L 41/5051; G06F 9/45558
USPC ........................................................ 709/222
See application file for complete search history.

(56) References Cited

U.S. PATENT DOCUMENTS

| | | | | |
|---|---|---|---|---|
| 8,219,653 | B1* | 7/2012 | Keagy | G06F 9/45537 709/222 |
| 9,628,433 | B2* | 4/2017 | Dolph | H04L 51/38 |
| 10,079,694 | B2* | 9/2018 | Hari | H04L 12/4645 |
| 2010/0122248 | A1* | 5/2010 | Robinson | G06F 9/5077 718/1 |

(Continued)

*Primary Examiner* — Liang Che A Wang
(74) *Attorney, Agent, or Firm* — Womble Bond Dickinson (US) LLP

(57) ABSTRACT

Embodiments of the present disclosure relate to a method, a device and a computer program product for configuring service instances. The method comprises, at a computing device being used to implement a first service instance in a cloud environment, receiving, from a service manager of the cloud environment, a hypervisor related to a configuration of the first service instance. The method further comprises determining, based on the hypervisor, first configuration information for configuring the first service instance. The method further comprises configuring the first service instance with the first configuration information. With this method, service auto-deployment, auto-configuration and auto-association are realized, thereby improving user efficiency of configuring services and user experience.

20 Claims, 6 Drawing Sheets

(56) References Cited

U.S. PATENT DOCUMENTS

| | | | |
|---|---|---|---|
| 2013/0232484 A1* | 9/2013 | Chieu | G06F 9/45558 |
| | | | 718/1 |
| 2018/0034781 A1* | 2/2018 | Jaeger | H04L 63/20 |
| 2018/0210450 A1 | 7/2018 | Ferrari et al. | |
| 2018/0210750 A1* | 7/2018 | Cui | G06F 9/45558 |
| 2019/0199611 A1* | 6/2019 | Kotadia | H04L 41/046 |
| 2019/0243671 A1* | 8/2019 | Yadav | G06F 9/45558 |
| 2020/0336420 A1* | 10/2020 | Joshi | H04L 45/74 |

* cited by examiner

METHOD, DEVICE AND COMPUTER PROGRAM PRODUCT FOR CONFIGURING SERVICE INSTANCE

CROSS-REFERENCE TO RELATED APPLICATION

This is a divisional application of U.S. patent application Ser. No. 16/588,951, filed Sep. 30, 2019, which claims the priority of Chinese Patent Application No. 201910345808.6, filed Apr. 26, 2019. The disclosure of the aforementioned applications is incorporated by reference herein its entirety.

FIELD

Embodiments of the present disclosure generally relate to the field of service management, and more specifically, to a method, a device and a computer program product for configuring service instances.

BACKGROUND

With fast development of Internet technologies, a cloud environment becomes a new system deployment pattern. The term "cloud" describes an integrated computing platform for implementing a cloud computing model, which allows an on-demand and easy to scale way to access to and use of a shared pool of computing resources, including services such as networks, virtual computing environments, servers, storage, software. These computing resources can be rapidly provisioned and released without excessive management resources or involvement of a service provider. Currently many service providers add a great number of available cloud services in a cloud network, such as an access to remote storage space, application programs hosted by a cloud platform, etc.

With rapid development of cloud computing, more and more companies begin to adopt these cloud services to process their services. However, there are still problems need to be solved with respect to the cloud services.

SUMMARY

Embodiments of the present disclosure provide a method, a device and a computer program product for configuring service instances.

According to a first aspect of the present disclosure, provided is a method of configuring service instances. The method comprises, at a computing device implementing a first service instance in a cloud environment: receiving, from a service manager of the cloud environment, a hypervisor related to a configuration of the first service instance. The method further comprises determining, based on the hypervisor, first configuration information for configuring the first service instance. The method further comprises configuring the first service instance with the first configuration information.

According to a second aspect of the present disclosure, provided is a method of configuring service instances. The method comprises receiving a first request for configuring services in a cloud environment from a client, the first request comprising configuration information related to the services, the configuration information comprising type indication information related to types of the services. The method further comprises determining services to be deployed and a hypervisor related to configurations of the services based on the type indication information. The method further comprises deploying the services to launch service instances corresponding to the services. The method further comprises transferring the hypervisor and the configuration information to a first service instance of the service instances to configure the service instances.

According to a third aspect of the present disclosure, provided is a computing device for configuring service instances. The computing device is used to implement a first service instance in a cloud environment. The computing device comprises: a processor; and a memory storing computer program instructions, the processor running the computer program instructions in the memory to control the computing device to perform acts comprising: receiving, from a service manager of the cloud environment, a hypervisor related to a configuration of the first service instance; determining, based on the hypervisor, first configuration information for configuring the first service instance; and configuring the first service instance with the first configuration information.

According to a fourth aspect of the present disclosure, provided is an electronic device for configuring service instances. The electronic device comprises: a processor; and a memory storing computer program instructions, the processor running the computer program instructions in the memory to control the electronic device to perform acts comprising: receiving a first request for configuring services in a cloud environment from a client, the first request comprising configuration information related to the services, the configuration information comprising type indication information related to the types of the services; determining services to be deployed and a hypervisor related to configurations of the services based on the type indication information; deploying the services to launch service instances corresponding to the services; and transferring the hypervisor and the configuration information to a first service instance of the service instances to configure the service instances.

According to a fifth aspect of the present disclosure, provided is a computer program product. The computer program product is tangibly stored on a non-transient computer readable medium and comprises machine executable instructions which, when being executed, cause a machine to perform the method according to the first aspect of the present disclosure.

According to a sixth aspect of the present disclosure, provided is a computer program product. The computer program product is tangibly stored on a non-transient computer readable medium and comprises machine executable instructions which, when being executed, cause a machine to perform the method according to the second aspect of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION OF EMBODIMENTS

Figure 1:
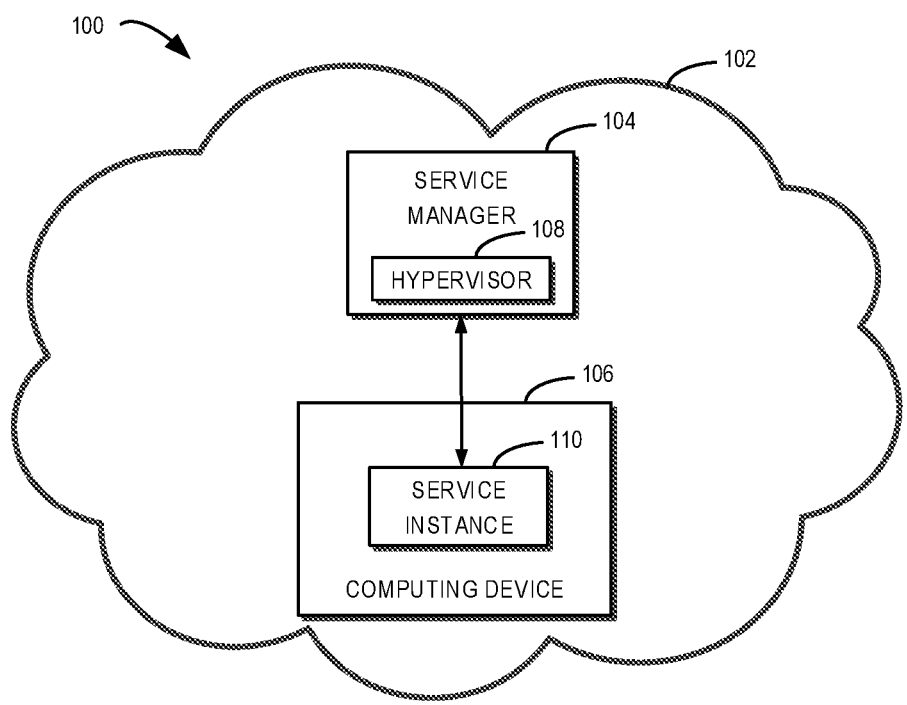
FIG. 1 shows a schematic view of an example environment 100 in which a device and/or a method can be implemented according to embodiments of the present disclosure.

Embodiments of the present disclosure will be described in more detail with reference to the accompanying drawings. Although the embodiments of the present disclosure have been illustrated, it should be understood that the present disclosure can be implemented in various manners, and thus should not be construed to be limited to embodiments disclosed herein. Rather, those embodiments are provided for a thorough and complete understanding of the present disclosure. It should be understood the accompanying drawings and embodiments of the present disclosure are only for illustration purpose rather than limiting the protection scope of the present disclosure.

The terms "include" and its variants used here are to be read as open terms that mean "include, but is not limited to." The term "based on" is to be read as "based at least in part on". The terms "one embodiment" and "the embodiment" are to be read as "at least one embodiment." The terms "first," "second" and the like may refer to different or the same objects. Other definitions, explicit and implicit, might be included below.

Principles of the present disclosure will be described with reference to several example embodiments shown in the accompanying drawings, in which the embodiments of the present disclosure have been illustrated. However, it should be understood these embodiments are described only for enabling those skilled in the art to better understand and further implement the present disclosure, rather than limiting the scope of the present disclosure in any manner.

As described herein, a "cloud" or "cloud environment" refers to an integrated computing platform for implementing a cloud computing model, which allows an on-demand and easy to scale way to access to and use of a shared pool of computing resources. The cloud environment is sometimes also referred to as a cloud platform or a cloud-based system. The cloud environment comprises a private-based or local area network-based private cloud, a public cloud based on a public accessible network, and other type of system including a distributed virtual infrastructure. Embodiments described herein are not limited to any arrangement pattern of infrastructure forming a cloud environment.

As described herein, "services" in the cloud environment are also referred to as "cloud services," which refer to functions, processing, operations or capabilities accessible via a cloud infrastructure. Examples of the services include virtual computing environments, virtual operating systems, virtual machines, networks, servers, data storage centers, software products or application programs, etc. Services, after being started in the cloud environment, are referred to as "service instances."

In traditional solutions, when using a service in a cloud environment, a user needs to manually deploy the service first. When deploying the service, the user needs to manually input deployment parameters and then submits them to the cloud for deploying the service. After the service is deployed, it is also needed the user to manually input configuration parameters of the service instance when starting the service instance. Since a use of a cloud service is rather complicated currently, the user needs to spend a large amount of time to understand the cloud service before correctly configuring the service. Such manual deployment and configuration process will consume the user considerable time and effort, and sometimes fail to realize an optimal configuration of services.

In addition, when using a plurality of services that are associated with one another, each service needs to be manually deployed and configured. At this moment, the user needs know deployment and configuration settings of each service and further manually associate various services after completion of the configuration. Such manual operations lead to a longer time for deployment, configuration and association when using the plurality of associated services, and thus user experience is degraded.

Therefore, in order to solve the foregoing problems, the present disclosure proposes a method of configuring services. In this method, after automatically deploying a service via a service manager, a service instance is directly injected to a hypervisor related to a configuration of the service to realize auto-configuration of the service instance. In addition, when there is a need to run a plurality of associated services, auto-association of services is realized with determined address information of the services. By adopting this method, time which a user spends on deploying, configuring and associating services is reduced significantly, and efficiency of deploying, configuring and associating services are increased, and furthermore user experience is improved.

FIG. 1 shows a schematic view of an example environment 100 in which a device and/or method according to embodiments of the present disclosure can be implemented. The example environment 100 includes a cloud environment 102. In some embodiments, the cloud environment 102 may include a public cloud which is on a public accessible network. In some embodiments, the cloud environment 102 may include a private-based or local area network-based private cloud. These examples are merely for describing instead of limiting the scope of the present disclosure, and the cloud environment 102 may be provided as including any suitable cloud according to needs.

The cloud environment 102 includes a service manager 104, which is configured to manage deployment and customized configuration of one or more services in the cloud environment 102. Examples of services may include application programs, such as email applications, data storage and management applications. Examples of services may further include servers, virtual computing environments, etc. These examples are merely for describing instead of limiting the scope of the present disclosure, and services may be set to any suitable form according to needs.

Functions of the service manager 104 may be implemented by a single physical or virtual computing device that forms the cloud environment 102, or may be distributed into a plurality of physical or virtual computing devices, e.g., jointly implemented by separate components on the plurality of computing devices. For example, the service manager 104 may include separate components which are used to implement deployment of service instances and configuration of service instances respectively.

When a user requests to use a service, the service manager 104 will present, to the user, an interface related to a service configuration template. The user selects or inputs parameters in the template to configure the service. Then, the user submits to the service manager 104 to deploy and configure the service. The example above is merely for describing rather than limiting the scope of the present disclosure. Those skilled in the art may obtain parameters for deploying and configuring services by any suitable means.

The service manager 104 receives a request for deploying and configuring the service which is sent by the user, to apply the service to the cloud environment 102. Upon receiving the request, the service manager 104 will determine, based on the received user parameters, a service to be deployed and computing resources and storage resources to be used during deploying the service.

In some embodiments, the service manager 104 sets different levels to services, and different levels corresponds to different numbers of computing resources and storage resources. When selecting computing resources and storage resources for the service, the user may directly select different levels for implementing an allocation of computing resources and storage resources. In some embodiments, the user may determine by him the number of computing resources and storage resources to be used. These examples are merely for illustrating rather than limiting the scope of the present disclosure, and information for deploying the service may be determined by any suitable means based on needs.

The service manager 104 deploys the service requested by the user to the computing device 106. In some embodiments, the computing device 106 represents computing resources and storage resources allocated to the service. Alternatively or additionally, the computing device 106 may be implemented on a separate or individual physical device. In some embodiments, the computing device 106 may represent a virtual machine for executing a service instance 110. These examples are merely for illustrating rather than limiting the computing device 106. The computing device 106 may be any suitable device or component for deploying and executing the service.

After the service is deployed on the computing device 106, the service manager 104 launches the service instance 110 corresponding to the service. When launching the service instance 110, the service manager 104 will transfer to the service instance 110 a hypervisor 108 for configuring the service instance 110. In some embodiments, the hypervisor 108 is script code written by programmers in advance. In some embodiments, the hypervisor 108 is in the service configuration template provided by the service manager 104 for the user. These examples are merely for describing rather than limiting the scope of the present disclosure, and those skilled in the art may set the hypervisor 108 as any suitable form based on needs.

After obtaining the hypervisor 108, the service instance 110 will run the hypervisor 108. The hypervisor 108 invokes a configuration script to configure the service instance 110. In some embodiments, the configuration script may be provided in the service instance 110. In some embodiments, the configuration script may also be provided in the service configuration template of the service manager 104. Alternatively or additionally, a storage address of the configuration script is stored in the hypervisor 108 of the service configuration template. The hypervisor 108 may obtain the address of the configuration script. These examples are merely for describing rather than limiting the scope of the present disclosure.

In some embodiments, the configuration script may obtain the user inputted parameters to configure the service instance 110. In some embodiments, the configuration parameters inputted by the user are transferred to the service instance 110 via the hypervisor 108. For example, the service manager 104 transfers the user inputted configuration parameters together with the script code of the hypervisor 108 to the server. In some embodiments, after the service instance 110 runs the hypervisor 108, the hypervisor 108 sends a request to the service manager 104 to obtain the user inputted configuration parameters. These examples are merely for illustrating rather than limiting the scope of the present disclosure. Those skilled in the art may automatically obtain the user inputted configuration parameters by any suitable means based on needs.

Figure 2:
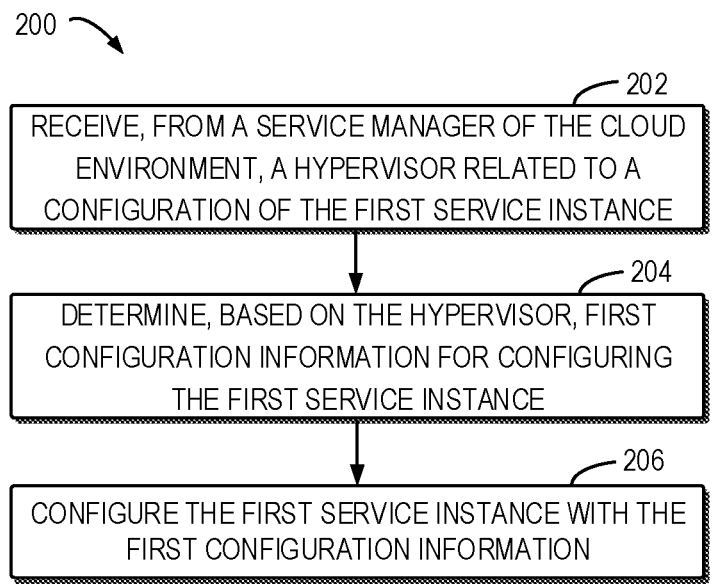
FIG. 2 shows a flowchart of a method 200 of configuring service instances according to embodiments of the present disclosure.

FIG. 1 has shown the schematic view of the example environment 100 in which a device and/or method may be implemented according to embodiments of the present disclosure. With reference to FIG. 2, description is presented below to a flowchart of a method 200 of configuring a service instance according to embodiments of the present disclosure.

The method 200 is performed at the computing device 106 that implement the service instance 110 in the cloud environment 102. At block 202, the service instance 110 of the computing device 106 receives the hypervisor 108 related to configuration of the service instance 110 from the service manager 104 of the cloud environment 102. In one example, the hypervisor 108 is a script program in the service manager 104. Alternatively or additionally, the script program resides in a service configuration template provided by the service manager 104 for the user. The example above is merely for describing rather than limiting the scope of the present disclosure. The hypervisor 108 may be set to be any suitable form and written in any suitable language based on needs.

In some embodiments, the hypervisor 108 is transferred to the computing device 106 when the service manager 104 launches the service instance 110. The example above is merely for describing rather than limiting the scope of the present disclosure. Those skilled in the art may set the service manager 104 based on needs, to transfer the hypervisor 108 at any suitable time.

At block 204, the service instance 110 of the computing device 106 determines, based on the hypervisor 108, configuration information for configuring the service instance 110. After receiving the hypervisor 108, the service instance 110 executes the hypervisor 108.

The hypervisor 108 may be used to obtain the configuration information for configuring the service instance 110. In some embodiments, the hypervisor 108 includes configuration information determined by the user input. Alternatively or additionally, configuration parameters are embedded to a script program that forms the hypervisor 108. When the script program is transferred to the service instance 110, the configuration information is transferred together with the script program. In some embodiments, the hypervisor 108 running in the service instance 110 will send a request for obtaining the configuration information to the service manager 104, and then the configuration information of the service instance 110 is obtained from the service manager 104 or an address specified by the service manager 104. These examples are merely for describing rather than limiting the scope of the present disclosure, and those skilled in the art may set any suitable way to automatically obtain the configuration information from the service manager 104 based on needs.

At block 206, the service instance 106 is configured using the configuration information. In some embodiments, the hypervisor 108 will invoke a configuration program to configure the service instance 110 during running. Alternatively or additionally, the configuration program is a configuration script. In some embodiments, the hypervisor 108 may obtain a storage address of the configuration script and obtain the configuration script through the storage address. In one example, the configuration script resides in the service instance 110. In another example, the configuration script resides in the service manager 104. Alternatively or additionally, the configuration script resides in a template of the service manager 104 which is used for configuring the service instance 110. In some embodiments, the hypervisor 108 may directly include the configuration script. These examples are merely for describing rather than limiting the scope of the present disclosure. Those skilled in the art may set a way in which the hypervisor 108 invokes the configuration program of the service, according to needs.

In some embodiments, the configuration program will check the configuration information to determine whether the user inputted configuration information is valid. In some embodiments, the configuration information includes a user name and a password and the user name and password will be verified. If the configuration information is valid, then the service instance 110 is configured using the configuration information.

By transferring the hypervisor 108 to the service instance 110 after launching the service instance 110, auto-configuration of the service instance 110 is realized after auto-deployment of the service. Compared with manual configuration of the service instance, such auto-configuration of the service instance increases efficiency of configuring the service instance after deploying the program and saves time for a user to understand the service before configuring the service, thereby improving user experience.

Figure 3:
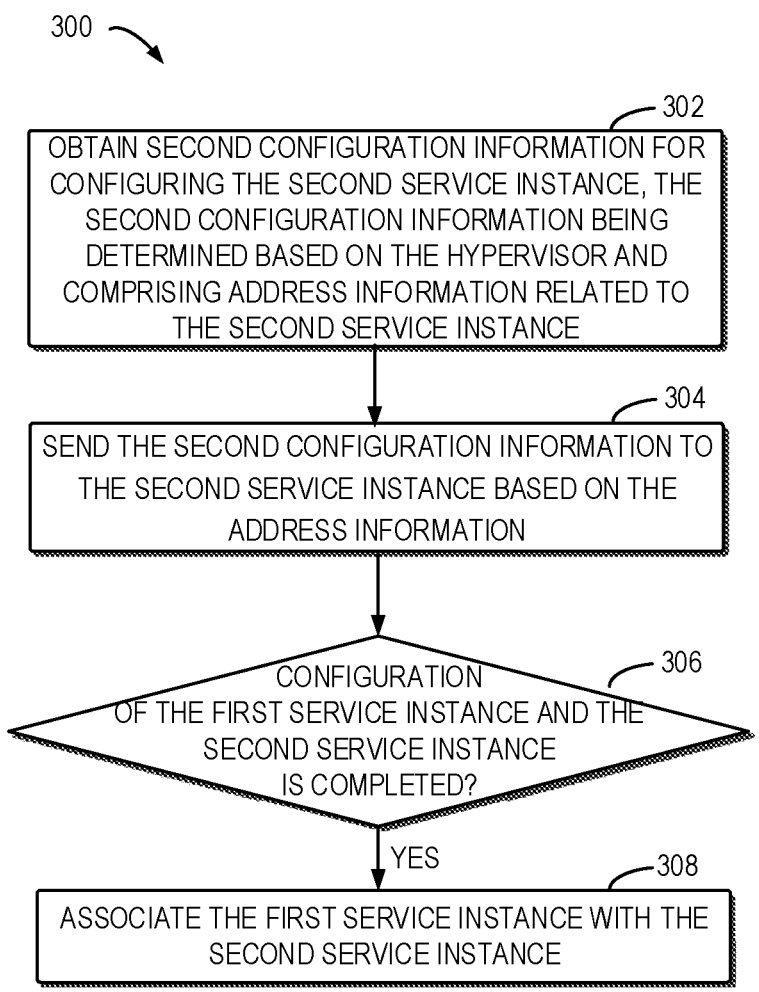
FIG. 3 shows a flowchart of a method 300 of configuring a further service instance according to embodiments of the present disclosure.

FIG. 2 has described the flowchart of the method 200 for configuring the service instance 110 according to embodiments of the present disclosure. With reference to FIG. 3, a flowchart of a method 300 of configuring a further service instance will be described below according to embodiments of the present disclosure.

A process of configuring the service instance 110 that runs on the computing device 106 is depicted in FIG. 2. There may also be, in the cloud environment 102, a further service instance associated with the service instance 110. For the sake of description, the service instance 110 is referred to as a first service instance, and the further service instance is referred to as a second service instance below. The second service instance may refer to one service instance or a plurality of service instances. A configuration of the second service instance is controlled by the hypervisor 108 of the first service instance.

At block 302, configuration information for configuring the second service instance is obtained. Like the configuration information of the first service instance, the configuration information of the second service instance is also determined based on the hypervisor 108 and includes address information related to the second service instance. The computing device 106 also obtains the configuration information of the second service instance while obtaining the configuration information of the first service instance.

When the user sends a request for configuring a service, the request includes parameter information for deploying and configuring the first and second service instances. In some embodiments, user inputted parameter information includes a type of service, computing resources and storage resources for deploying the first and second services, as well as parameters for configuring the first and the second service instances. Alternatively or additionally, the parameter information further includes addresses of various service instances determined by the user input, such as an IP address of a service. These examples are merely for describing rather than limiting the scope of the present disclosure. Those skilled in the art may set content of the parameter information based on needs.

The service manager 104 automatically deploys the service based on the inputted parameter information. In one example, the service to be deployed is determined based on a service type inputted by a user. After the first and second services are automatically deployed, the first and second service instances are automatically launched. After the service instances are launched, the hypervisor 108 is transferred to the first service instance. The configuration information of the second service instance is also obtained while the configuration information of the first service instance is obtained through the hypervisor 108.

At block 304, the second configuration information is sent to the second service instance based on the address information. Since the address information of the second service instance is known, the configuration information of the second service instance may be sent to the second service instance by running a configuration program at the computing device 106. In some embodiments, the first service instance sends a connection request to the second service instance, and the configuration information is transferred to the second service instance when the second service instance returns a response. These examples are merely for describing rather than limiting the scope of the present disclosure. Those skilled in the art may set any suitable way to connect to the second service instance and send the configuration information to the second service instance based on needs.

In some embodiments, the configuration program of the first service instance running at the computing device 106 checks whether the configuration parameters for the second service instance are valid or not. If the configuration information of the second service instance is valid, then the second configuration information is sent to the second service instance.

At block 306, it is determined whether the configurations of both the first and second service instances are completed. In some embodiments, after the configuration of the first service instance is completed, a request will be sent to the second service instance, and then a response is obtained from the second service instance to determine whether the configuration of the second service instance is completed. In some embodiments, upon completion of the configuration of the second service instance, a configuration completion message will be automatically sent to the first service instance. These examples are merely for describing rather than limiting the scope of the present disclosure, and those skilled in the art may set any suitable way to determine completion of the configuration of the first and second service instances.

If the configurations of both the first and second service instances are completed, then at block 308, the first service instance is associated with the second service instance.

The time instant when service instances are associated with each other may be set based on actual needs. In some embodiments, where there is a plurality of service instances, the hypervisor 108 may be run to monitor configurations of the plurality of service instances. Then, two configured service instances with an association relation are associated with each other. This association process may be completed under a control of the hypervisor 108. In some embodiments, the hypervisor 108 may determine a priority of a service instance and then configure the service instance according to its priority. These examples are merely for describing rather than limiting the scope of the present disclosure, and those skilled in the art may associate service instances by any suitable means based on needs.

When a plurality of associated service instances is running, the plurality of the service instances is automatically associated after being automatically configured. Compared with a traditional manual configuration of service instances and manual association of services, the foregoing method increases configuration and association efficiency of associated services, saves time for users, and improves utilization efficiency of services.

While the method 300 for configuring a further service instance in a computing device assigned in a cloud has been described in conjunction with FIG. 3, a schematic view of an example environment 400 in which a device and/or method according to embodiments of the present disclosure may be implemented will be described in conjunction with FIG. 4.

A cloud environment 402, a service manager 404 and a hypervisor 408 included in the example environment 400 are the same as the cloud environment 102, the service manager 104 and the hypervisor 108 in FIG. 1, and thus are not detailed herein.

The cloud environment 402 further includes a plurality of associated service services 410-1, 410-2, . . . , 410-n (collectively referred to as a service instance 410 for the sake of description) running thereon, where n is a positive integer. Those skilled in the art may set the number of the service instances 410 running in the cloud environment 402 based on needs.

A user 414 inputs deployment and configuration parameters of a service via a client 412 and then sends them to the service manager 404. In some embodiments, when the user 414 requests to configure a service, the service manager 404 will present, to the user 414, an interface corresponding to a template for configuring services via the client 412. The user 414 inputs user-selected parameters and then submits them to the service manager 404. The example is merely for describing rather than limiting the scope of the present disclosure. Those skilled in the art may provide configuration parameters to the service manager 404 by any suitable means based on needs.

The service manager 404 deploys the service based on the received used-inputted parameters. In some embodiments, storage and computing resources needed for deploying the service are determined from the user-inputted parameters. After the service manager 404 automatically deploys the service, the service manager 404 launches the service instance 410 corresponding to the service. When the service manager 404 launches the service instance 410, the service manager 404 will transfer the hypervisor 408 to one service instance 410-1 of the service instances 410. Then, the hypervisor 408 is run in the service instance 410-1. After that, the service instance 410-1 is configured through the hypervisor 408.

Figure 4:
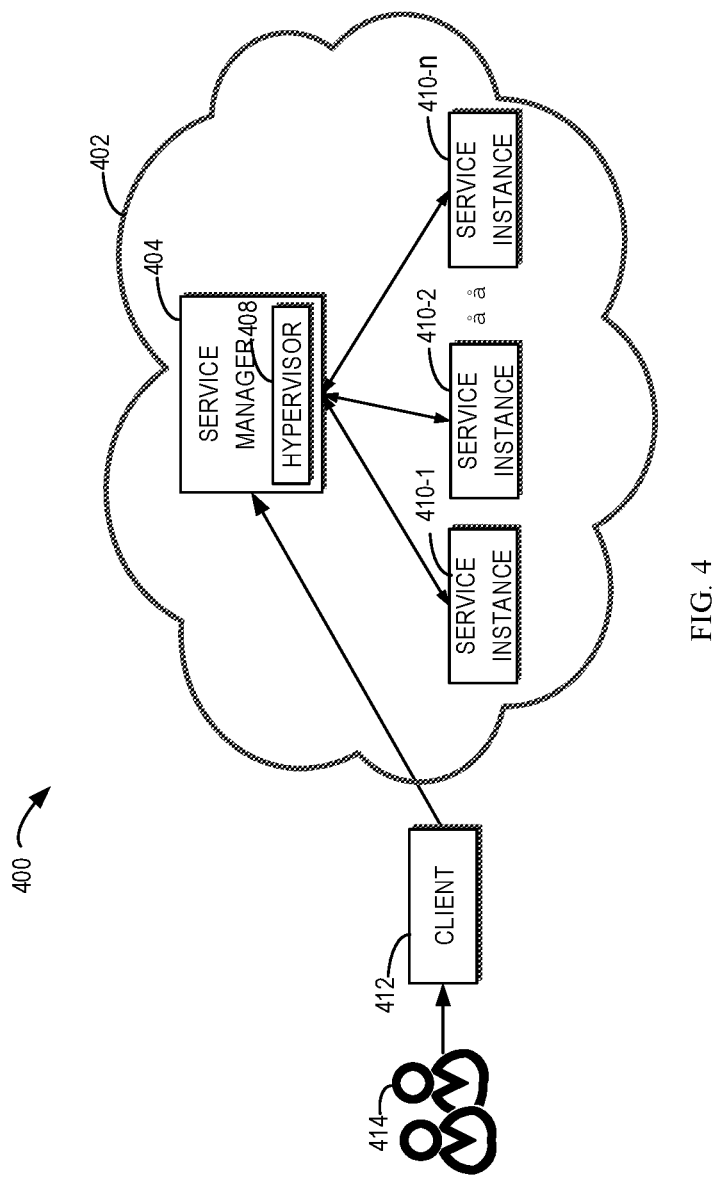
FIG. 4 shows a schematic view of an example environment 400 in which a device and/or a method according to embodiments of the present disclosure can be implemented.
Figure 5:
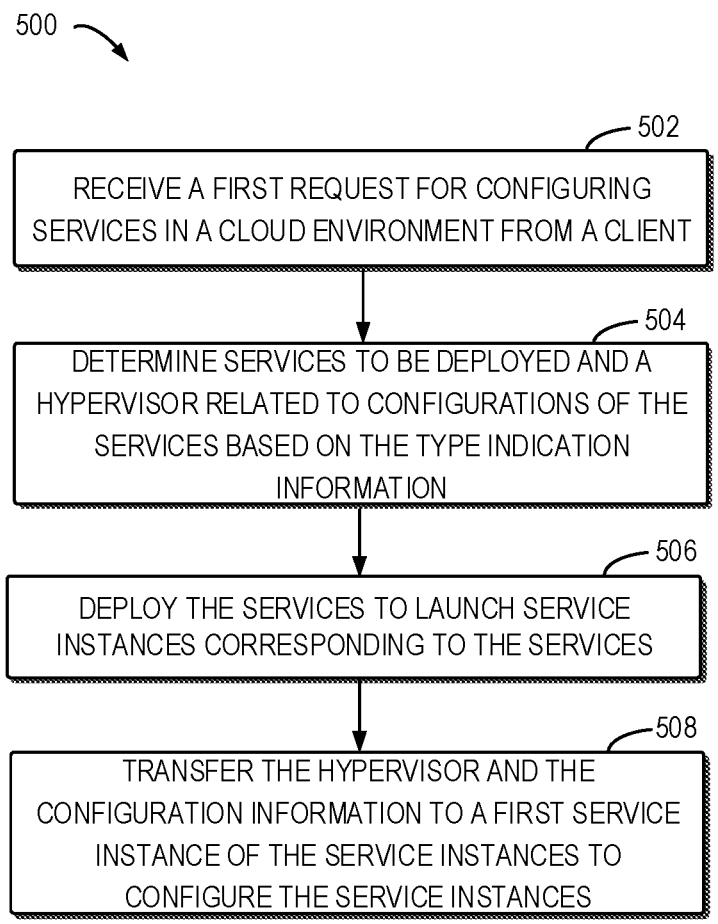
FIG. 5 shows a flowchart of a method 500 of configuring service instances according to embodiments of the present disclosure.

The schematic view of the example environment 400 for configuring a service instance has been described in FIG. 4. With reference to FIG. 5, a method 500 of configuring a service instance at the service manager 404 will be described with reference to FIG. 5.

At block 502, the service manager 404 receives, from the client 412, a request for configuring a service in the cloud environment 402, where the request includes configuration information related to the service. In some embodiments, the configuration information includes type indication information related to the type of the service. Alternatively or additionally, this configuration information further includes sizes of storage and computing resources for deploying the service as determined by the user, a user name and password for configuring a service instance, etc. These examples are merely for describing rather than limiting the scope of the present disclosure. Those skilled in the art may set content of the configuration information according to needs.

At block 504, the service manager 404 determines, based on the type indication information, a service to be deployed and a hypervisor 408 related to the configuration of the service. Upon the user's configuration information is received, a service to be deployed and configured may be determined based on a type of the service selected by the user to be used, and a hypervisor 408 corresponding to the service may be selected. In some embodiments, the hypervisor 408 resides in a service configuration template of the service manager 404. These examples are merely for describing rather than limiting the scope of the present disclosure.

At block 506, the service manager 404 deploys the service to launch a service instance 410 corresponding to the service. A service which the user wants to deploy and parameters for deploying the service may be determined from the user's configuration information. According to user-selected parameters, the service manager 404 automatically deploys various services. Upon completion of auto-deployment of various services, the service manager 404 automatically launches the service instance 410 corresponds to the service.

At block 508, the service manager 404 transfers the hypervisor 408 and the configuration information to one service instance 410-1 of the service instances 410 to configure the service instance 410. In some embodiments, the hypervisor 408 is script code written by programmers in advance. In some embodiments, the hypervisor 408 resides in a service configuration template provided by the service manager 404 for the user. These examples are merely for describing rather than limiting the scope of the present disclosure, and those skilled in the art may set the hypervisor 408 as any suitable form based on needs.

The service instance 410-1 will run the hypervisor 408 after obtaining the same. The hypervisor 408 invokes a configuration script to configure the service instance 410-1 and transfers to a further service instance configuration parameters related to the further service instance to configure the further service instance.

In some embodiments, when the service instance 410-1 is launched, the hypervisor 408 and the configuration information are transferred to the service instance 410-1. In some embodiments, when the service instance 410-1 is launched, the hypervisor 408 is transferred to the service instance 410-1 to run the hypervisor 408 in the service instance 410-1. The hypervisor 408 will send, to the service manager 404, a request for obtaining user-inputted configuration information. Upon receiving of the request, the service manager 404 will send the configuration information to the service instance 410-1 to configure the same through the hypervisor 408.

By automatically deploying service instances, the hypervisor and configuration parameters for configuring service instances are transferred to one of the service instances to configure an associated service instance, thereby realizing auto-configuration of an associated service. Compared with manual deployment and configuration of a service, configuration efficiency of the service is improved by auto-deployment and auto-configuration of the service, and it saves time for the user.

Figure 6:
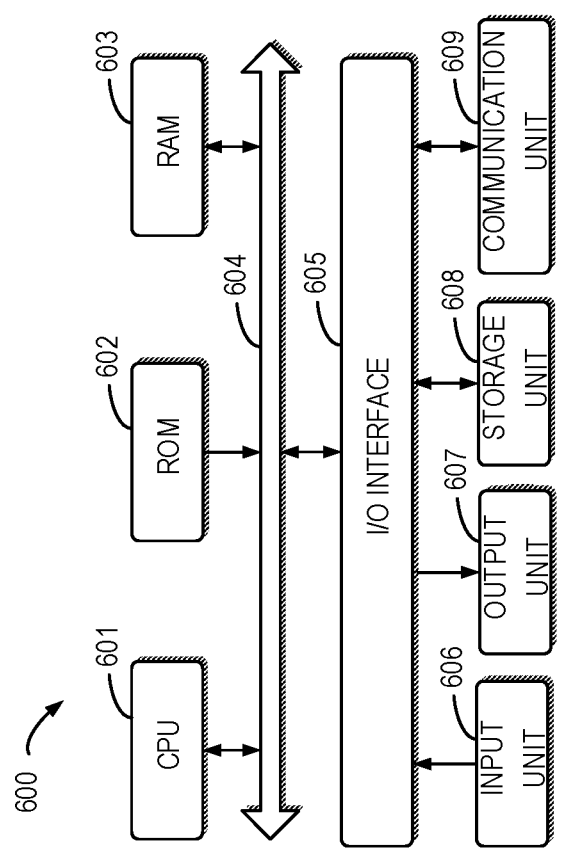
FIG. 6 shows a schematic block diagram of an example device 600 which is applicable to implement embodiments of the present disclosure.

FIG. 6 shows a schematic block diagram of an example device 600 suitable for implementing embodiments of the present disclosure. For example, any one of 102 and 104 as shown in FIGS. 1 and 404, 412 as shown in FIG. 4 may be implemented by the device 600. As shown, the device 600 includes a central processing unit (CPU) 601 which is capable of performing various appropriate actions and processes in accordance with computer program instructions stored in a read only memory (ROM) 602 or computer program instructions loaded from a storage unit 608 to a random access memory (RAM) 603. In the RAM 603, there are also stored various programs and data required by the device 600 when operating. The CPU 601, ROM 602 and RAM 603 are connected to one another via a bus 604. An input/output (I/O) interface 605 is also connected to the bus 604.

A plurality of components in the device 600 are connected to the I/O interface 605, including: an input unit 606 such as a keyboard, a mouse, or the like; an output unit 607, such as various types of displays, a loudspeaker or the like; a storage unit 608, such as a disk, an optical disk or the like; and a communication unit 609, such as a network card, a modem, a wireless communication transceiver or the like. The communication unit 609 allows the device 600 to exchange information/data with other device via a computer network, such as the Internet, and/or various telecommunication networks.

The above-described procedures and processes such as the methods 200, 300 and 500 may be executed by the processing unit 601. For example, in some embodiments, the methods 200, 300 and 500 may be implemented as a computer software program, which is tangibly embodied on a machine readable medium, e.g. the storage unit 608. In some embodiments, part or an entirety of the computer program may be loaded to and/or installed on the device 600 via the ROM 602 and/or the communication unit 609. The computer program, when loaded to the RAM 603 and executed by the CPU 601, may execute one or more acts of the methods 200, 300 and 500 as described above.

The present disclosure may be a method, a device, a system, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, electronic circuitry including, for example, a programmable logic circuitry, a field-programmable gate arrays (FPGA), or a programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A computer-implemented method of configuring service instances, the method comprising:
   receiving a first request for configuring services in a cloud environment from a client, the first request comprising configuration information related to the services, the configuration information comprising type indication information related to types of the services;
   determining services to be deployed and a hypervisor related to configurations of the services based on the type indication information;
   automatically deploying the services to launch service instances corresponding to the services; and
   transferring the hypervisor and the configuration information to a first service instance of the service instances to configure the service instances, wherein the configuration information includes sizes of storage and computing resources for deploying the services.

2. The method according to claim 1, wherein transferring the hypervisor and the configuration information to the first service instance of the service instances comprises:
   launching the first service instance; and
   in response to launching the first service instance, transferring the hypervisor and the configuration information to the first service instance.

3. The method according to claim 1, wherein transferring the hypervisor and the configuration information to the first service instance of the service instances comprises:
   launching the first service instance; and
   in response to launching the first service instance, transferring the hypervisor to the first service instance to run the hypervisor in the first service instance.

4. The method according to claim 3, further comprising:
   receiving a second request from the first service instance for obtaining the configuration information, wherein the second request is generated by the hypervisor; and
   in response to the request, returning the configuration information to the first service instance.

5. The method according to claim 1, wherein the configuration information further comprises a size of a storage for deploying the services.

6. The method according to claim 1, wherein the configuration information further comprises a size of processing resources for deploying the services.

7. The method of claim 1, wherein the configuration information was specified by a user via a user interface of the client.

8. A non-transitory machine-readable medium having instructions stored therein, which when executed by a processor, cause the processor to perform operations of configuring service instances, the operations comprising:
   receiving a first request for configuring services in a cloud environment from a client, the first request comprising configuration information related to the services, the configuration information comprising type indication information related to types of the services;
   determining services to be deployed and a hypervisor related to configurations of the services based on the type indication information;
   automatically deploying the services to launch service instances corresponding to the services; and
   transferring the hypervisor and the configuration information to a first service instance of the service instances to configure the service instances, wherein the configuration information includes sizes of storage and computing resources for deploying the services.

9. The machine-readable medium according to claim 8, wherein transferring the hypervisor and the configuration information to the first service instance of the service instances comprises:
   launching the first service instance; and
   in response to launching the first service instance, transferring the hypervisor and the configuration information to the first service instance.

10. The machine-readable medium according to claim 8, wherein transferring the hypervisor and the configuration information to the first service instance of the service instances comprises:
   launching the first service instance; and
   in response to launching the first service instance, transferring the hypervisor to the first service instance to run the hypervisor in the first service instance.

11. The machine-readable medium according to claim 10, wherein the operations further comprise:
receiving a second request from the first service instance for obtaining the configuration information, wherein the second request is generated by the hypervisor; and
in response to the request, returning the configuration information to the first service instance.

12. The machine-readable medium according to claim 8, wherein the configuration information further comprises a size of a storage for deploying the services.

13. The machine-readable medium according to claim 8, wherein the configuration information further comprises a size of processing resources for deploying the services.

14. The machine-readable medium of claim 8, wherein the configuration information was specified by a user via a user interface of the client.

15. An electronic device, comprising:
a processor; and
a memory having instructions stored therein, which when executed by the processor, cause the processor to perform operations of configuring service instances, the operations comprising:
receiving a first request for configuring services in a cloud environment from a client, the first request comprising configuration information related to the services, the configuration information comprising type indication information related to types of the services;
determining services to be deployed and a hypervisor related to configurations of the services based on the type indication information;
automatically deploying the services to launch service instances corresponding to the services; and
transferring the hypervisor and the configuration information to a first service instance of the service instances to configure the service instances, wherein the configuration information includes sizes of storage and computing resources for deploying the services.

16. The device according to claim 15, wherein transferring the hypervisor and the configuration information to the first service instance of the service instances comprises:
launching the first service instance; and
in response to launching the first service instance, transferring the hypervisor and the configuration information to the first service instance.

17. The device according to claim 15, wherein transferring the hypervisor and the configuration information to the first service instance of the service instances comprises:
launching the first service instance; and
in response to launching the first service instance, transferring the hypervisor to the first service instance to run the hypervisor in the first service instance.

18. The device according to claim 17, wherein the operations further comprise:
receiving a second request from the first service instance for obtaining the configuration information, wherein the second request is generated by the hypervisor; and
in response to the request, returning the configuration information to the first service instance.

19. The device according to claim 15, wherein the configuration information further comprises a size of a storage for deploying the services.

20. The device according to claim 15, wherein the configuration information further comprises a size of processing resources for deploying the services.

* * * * *